Aug. 13, 1935.　　　W. H. FRIEDMAN　　　2,011,335
ARC WELDING APPARATUS
Filed Oct. 25, 1934

INVENTOR.
William H. Friedman.
BY
George V. Woodling
ATTORNEY.

Patented Aug. 13, 1935

2,011,335

UNITED STATES PATENT OFFICE 2,011,335

ARC WELDING APPARATUS

William H. Friedman, Youngstown, Ohio, assignor of one-fifth to David Clayman, Niles, Ohio, and one-fourth to Eugene Ungar, Youngstown, Ohio Application October 25, 1934, Serial No. 749,939

2 Claims. (Cl. 219—8)

My invention relates in general to electrical apparatus, and more particularly to arc welding apparatus.

In arc welding, it is important that the temperature distribution over the surface of the joint being welded be as uniform as possible. To this end, the utilization of alternating current is much better than direct current. This is because of the skin effect produced by the alternating current; in that the current density, with the alternating current, is greater nearer the surface than at the center of the material being welded. The action of the skin effect tends to maintain an even temperature throughout the joint being welded even though radiation of heat is dissipated from the surface of the joint being welded.

While alternating current is more desirable than direct current from the standpoint of temperature distribution; yet there is one major difficulty encountered by utilizing alternating current. This difficulty resides in the fact that, by reason of the undulation of the alternating current, it is quite difficult to maintain a stable arc, and thus produce a good sound weld. Therefore, an object of my invention is to provide for stabilizing the welding arc produced by an alternating current supply source.

Another object of my invention is to provide for super-imposing upon the primary current of the welding arc, a stabilizing secondary current to produce a more stable arc than that which would be produced by utilizing the primary current alone.

A further object of my invention is the provision of employing a leakage reactance transformer, and of connecting both the primary and the secondary windings of the transformer in circuit relation with the welding arc.

Another object of my invention is the provision of an indicating device for assuring that the electrical circuits are properly connected to the alternating current supply source.

Figure 1:
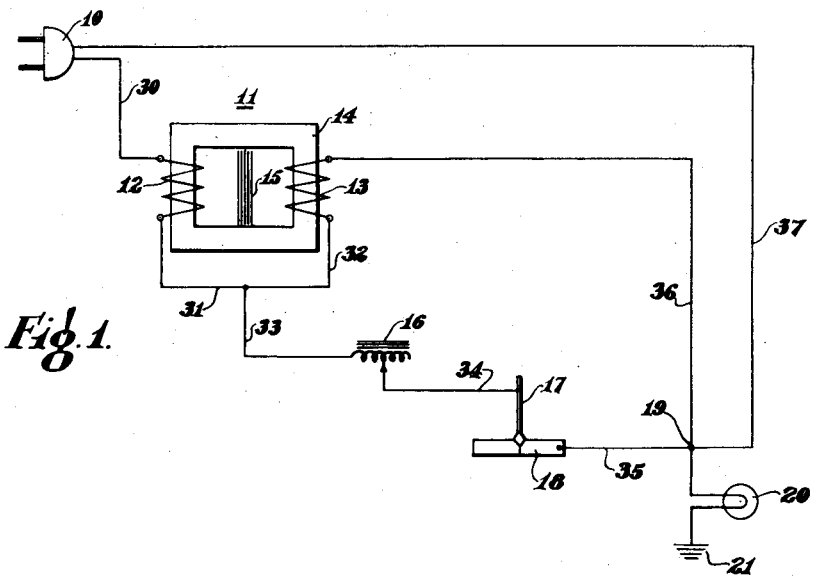
Figure 2:
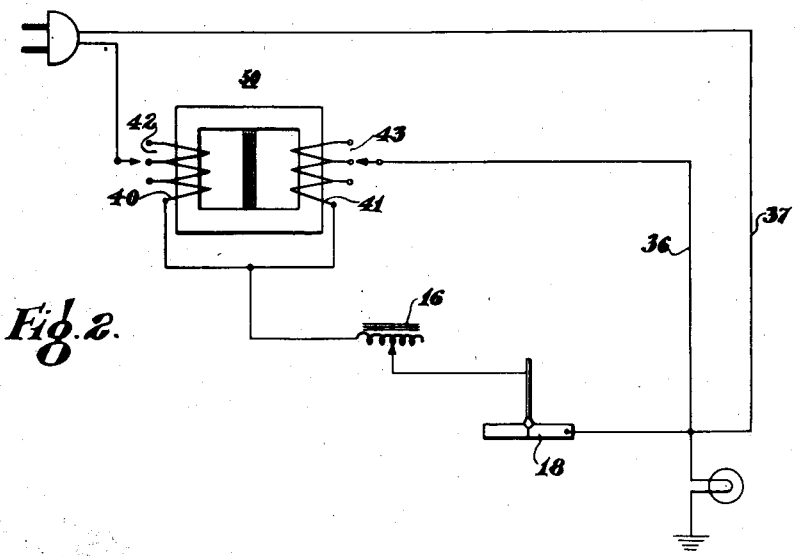

Other objects and a fuller understanding of my invention may be had by referring to the following description, taken in conjunction with the accompanying drawing, in which:

Figure 1 represents a diagrammatic view of an arc welding apparatus, embodying the features of my invention; and, Figure 2 is a modified arrangement of my arc welding apparatus.

With reference to Figure 1 of the drawing, my invention comprises, in general, a leakage reactance transformer 11 having a primary winding 12 and a secondary winding 13, an adjustable reactance coil 16, and an indicating lamp 20.

The transformer 11 may be of any suitable design, and, as illustrated, comprises a rectangular magnetic core 14 upon the two legs of which are mounted the primary winding 12 and the secondary winding 13. Disposed between the primary winding 12 and the secondary winding 13 is a magnetic shunt 15 which extends substantially from one side of the magnetic core to the other side, there being a small air gap at each end to effect a certain reluctance. The magnetic shunt 15 is so arranged that substantially all of the primary flux interlaces the secondary winding 13, when the current flowing through the secondary winding is relatively low, and so designed that a relatively large amount of the primary flux flows through the magnetic shunt 15 when the current flowing through the secondary winding 13 is relatively large. The adjustable reactance coil 16 may be of any suitable design, and its purpose is not only to aid in the stabilizing of the welding arc, but also to limit the value of the welding current, so that welding electrodes of variable sizes may be employed ranging from relatively small electrodes to relatively large electrodes.

The indicating lamp 20 is used to insure that the welding circuit is properly connected to the alternating current supply source. Thus, for instance, if the lamp 20 is illuminated when the electric plug 10 is inserted into a suitable alternating current supply source, it is an indication that the electrical apparatus is improperly connected to the alternating current supply source. Therefore, the operator must disengage the plug 10 from the alternating current supply source and reinsert it with reverse connection. When this is done, the electrical apparatus is properly connected to the alternating current supply source and the lamp 20 will not burn, as there will be no current flowing through the lamp to the ground 21, which, in turn, flows to the grounded side of the alternating current supply source.

The path through which the line welding current flows during the welding operation may be traced as follows: Beginning with the plug 10, the current flows through the conductor 30, the primary winding 12 of the leakage reactance transformer 11, the conductors 31 and 33, the adjustable reactance coil 16, the conductor 34, the welding electrode 17, the article being welded 18, the conductor 35 to the point 19, and finally through the conductor 37 back to the plug 10. At the same time that the main or primary circuit is established, there is also established a secondary stabilizing circuit which may be traced as follows: Beginning with the lower terminal of the secondary winding 13, the stabilizing current flows through the conductors 32 and 33, the adjustable reactance coil 16, the conductor 34, the welding electrode 17, the article being welded 18, and the conductor 35 to the point 19, and finally through the conductor 36 to the upper terminal of the secondary winding 13. It is noted that this stabilizing circuit flows through a closed circuit which has the property of positively maintaining the stabilizing current at a substantially uniform value. In explaining the action of the stabilizing current of the closed circuit, let it first be assumed that the voltage of the alternating current supply source is at a maximum, or peak value. Under this condition, there will be a tendency for the welding arc to be strong, thus affording a relatively low resistance to the current flow. This means that, under condition of relatively low resistance in the welding arc, the stabilizing current which flows through the closed circuit will tend to increase to its maximum value. But just as soon as the stabilizing current tends to increase to its maximum value, there will be created a relatively large secondary flux in the secondary coil 13 to oppose any passage of the primary flux. Consequently, a larger amount of the primary flux will flow through the magnetic shunt 15, with the result that the voltage induced in the secondary winding 13 is materially decreased to such a value that the stabilizing current which flows through the closed circuit is maintained at substantially a constant value, even though the resistance of the welding arc has decreased under conditions of maximum peak voltage of the alternating current supply source. Now, let it be assumed that the voltage of the alternating current supply source is relatively low, as it will be when it changes from a positive to a negative value, or vice versa. Under the condition of a relatively low alternating current voltage, it is noted that the welding arc tends to be weak. This means that the resistance of the welding arc is correspondingly high, with the result that there is a tendency for the stabilizing current of the closed circuit to decrease. But it is noted that, with a decrease in the current flow of the closed circuit, there will be less secondary flux opposing the passage of the primary flux, with the result that there will be a larger amount of the primary flux interlacing the secondary winding 13. Accordingly, a higher voltage will be induced in the secondary winding 13 to maintain the value of the stabilizing current of the closed circuit at substantially a constant value, even though the resistance of the welding arc is relatively high through periods of relatively low alternating current voltages. From the foregoing, it is noted that the action of the closed circuit is such that it gives a good weld, devoid of all defects.

The function of the adjustable reactance coil 16 is two fold: In one capacity the adjustable reactance coil helps to stabilize the welding arc in addition to the stabilizing action of the closed circuit. In another capacity it serves as a means to vary the value of the welding current, so that welding electrodes of various dimensions may be employed. That is, in the event that it is necessary to use relatively small electrodes for welding relatively thin metal, the adjustable reactance coil 16 will be so set as to prevent undue overheating of the small welding electrodes. On the contrary, when relatively large welding electrodes are employed, the adjustable reactance coil 16 may be set to give a relatively large amount of welding current.

In Figure 2, I show a modified arrangement of my welding circuit, in that the value of the welding current may be varied by having adjustable taps 42 and 43 provided respectively upon the primary winding 40 and the secondary winding 41 of the transformer 50. With the modified arrangement of my welding circuits, the value of the welding current may be varied either by changing the adjustable taps 42 of the primary winding 40, or by changing the adjustable taps 43 of the secondary winding 41, or by changing the adjustment of the adjustable reactance coil 16, or by changing them in combination with each other.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A system adapted to be connected to an alternating current supply source for energizing an electrical arc load having a variable working resistance comprising, in combination, a magnetic core, a secondary winding disposed to surround a portion of the magnetic core, said portion being designated as a secondary core portion, a primary winding associated with the secondary winding and disposed to surround another portion of the magnetic core, circuit connections for connecting the primary winding and the arc load in series circuit relation with the alternating current supply source, circuit connections for connecting the arc load in closed circuit relationship with the secondary winding, and magnetic shunt means having a relatively high reluctance disposed between the primary winding and the secondary winding, said magnetic shunt means being adapted, when the secondary core portion has a relatively low secondary flux opposing the passage of the primary flux, to by-pass a relatively small amount of the primary flux, thereby causing the induction of a relatively high voltage in the secondary winding, and being adapted, when the secondary core portion has a relatively high secondary flux, opposing the passage of the primary flux, to by-pass a relatively large amount of the primary flux, thereby reducing the voltage induced in the secondary winding, with the result that the reluctance of the secondary core portion varies substantially inversely with changes in the resistance of the electrical arc load to protect the said windings from being overloaded during the welding operation.

2. A system adapted to be connected to an alternating current supply source having a grounded side for energizing an electrical arc load having variable working resistance comprising, in combination, a magnetic core, a secondary winding disposed to surround a portion of the magnetic core, said portion being designated as a secondary core portion, a primary winding associated with the secondary winding and disposed to surround another portion of the magnetic core, circuit connections for connecting the primary winding and the arc load in series circuit relation with the alternating current supply source, circuit connections for connecting the arc load in closed circuit relationship with the secondary winding, indicating means for insuring that the primary winding is connected in proper circuit relationship with the grounded side of the alternating current supply source, magnetic shunt means having a relatively high reluctance disposed between the primary winding and the secondary winding, said magnetic shunt means being adapted, when the secondary core portion has a relatively low secondary flux opposing the passage of the primary flux, to by-pass a relatively small amount of the primary flux, thereby causing the induction of a relatively high voltage in the secondary winding, and being adapted, when the secondary core portion has a relatively high secondary flux, opposing the passage of the primary flux, to by-pass a relatively large amount of the primary flux, thereby reducing the voltage induced in the secondary winding, with the result that the reluctance of the secondary core portion varies substantially inversely with changes in the resistance of the electrical arc load to protect the said windings from being overloaded during the welding operation, and means for varying the value of the current flowing through the electrical arc load.

WILLIAM H. FRIEDMAN.